March 29, 1966 F. L. LANGFORD 3,242,571

MACHINES FOR MOLDING PLASTIC PRODUCTS

Original Filed July 11, 1962 5 Sheets-Sheet 1

INVENTOR:
Forrest L. Langford

By Smyth, Roston & Pavitt
Attorneys

March 29, 1966   F. L. LANGFORD   3,242,571
MACHINES FOR MOLDING PLASTIC PRODUCTS
Original Filed July 11, 1962   5 Sheets-Sheet 2
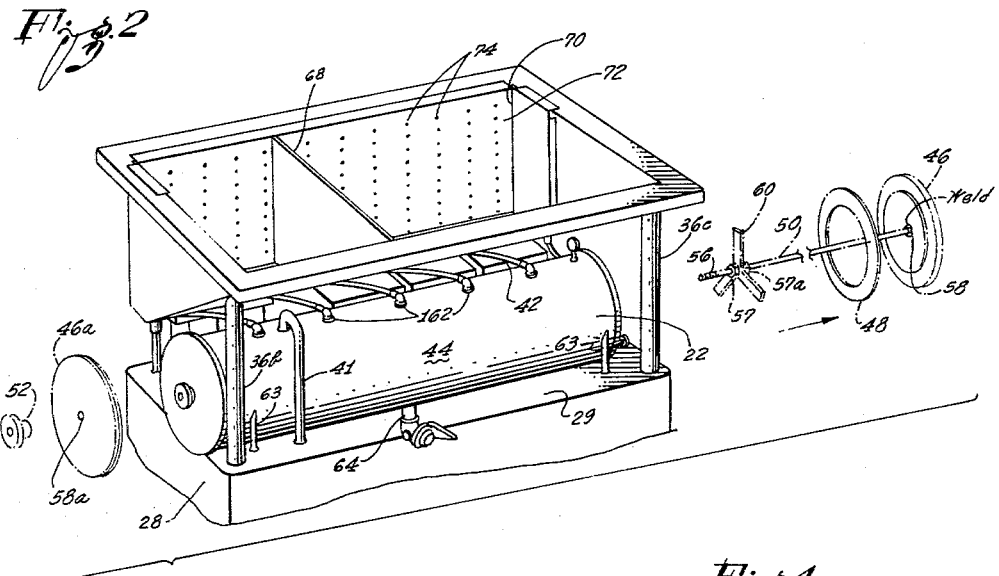
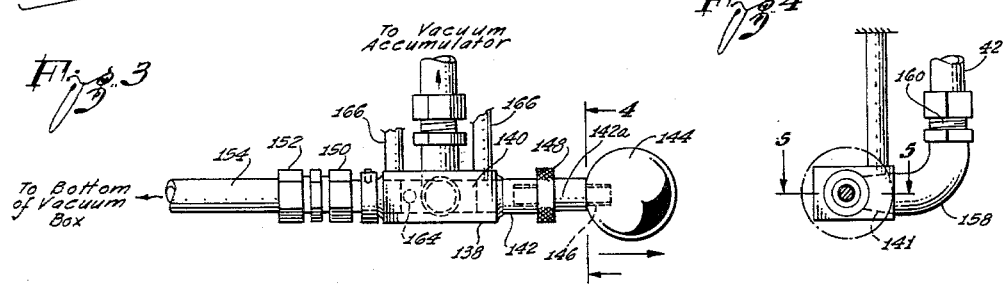
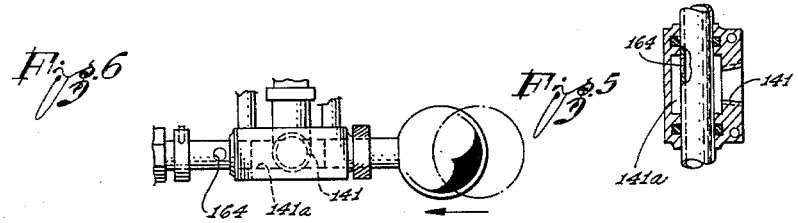
INVENTOR:
Forrest L. Langford
Attorneys

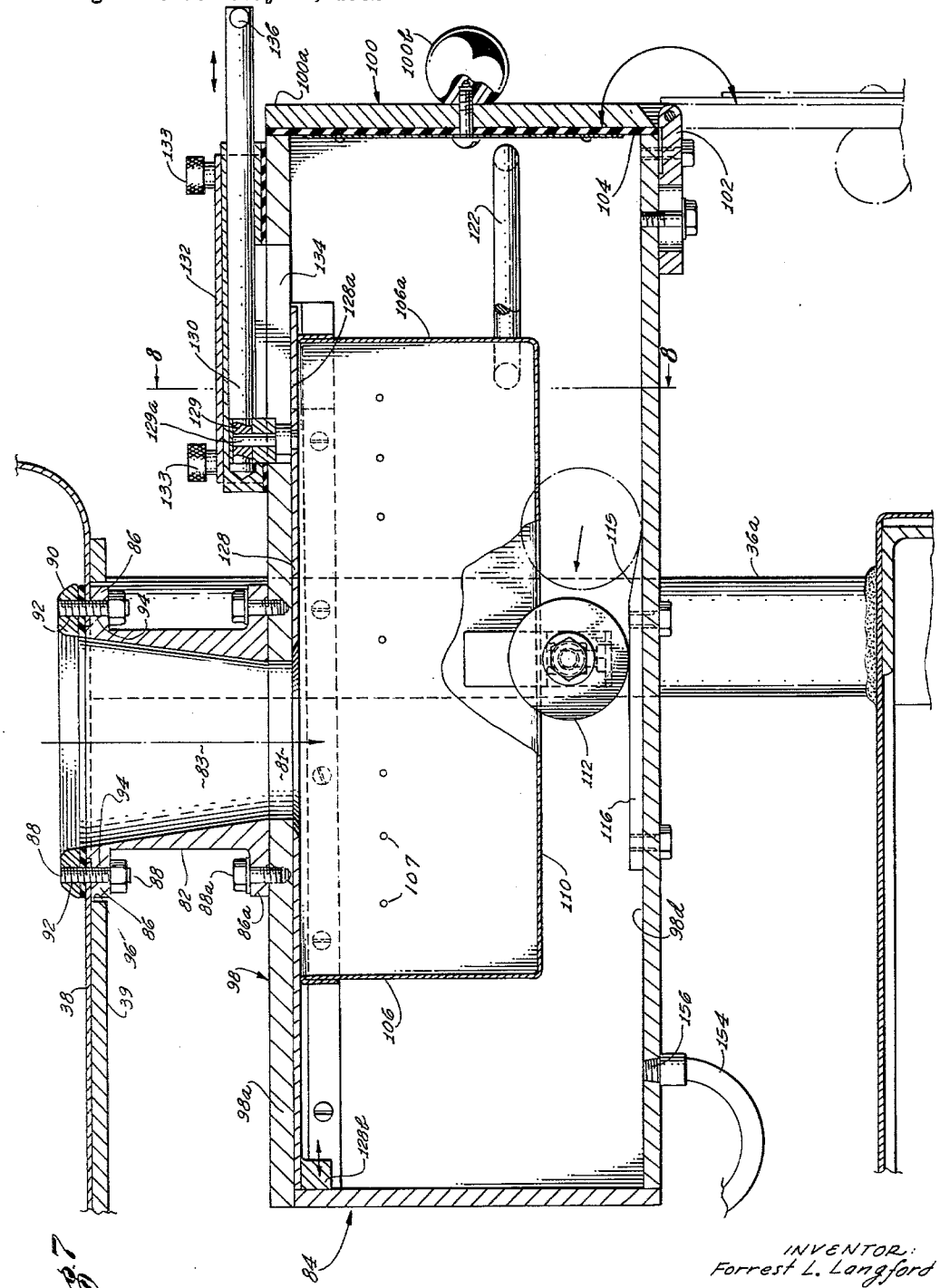

March 29, 1966  F. L. LANGFORD  3,242,571
MACHINES FOR MOLDING PLASTIC PRODUCTS
Original Filed July 11, 1962  5 Sheets-Sheet 4
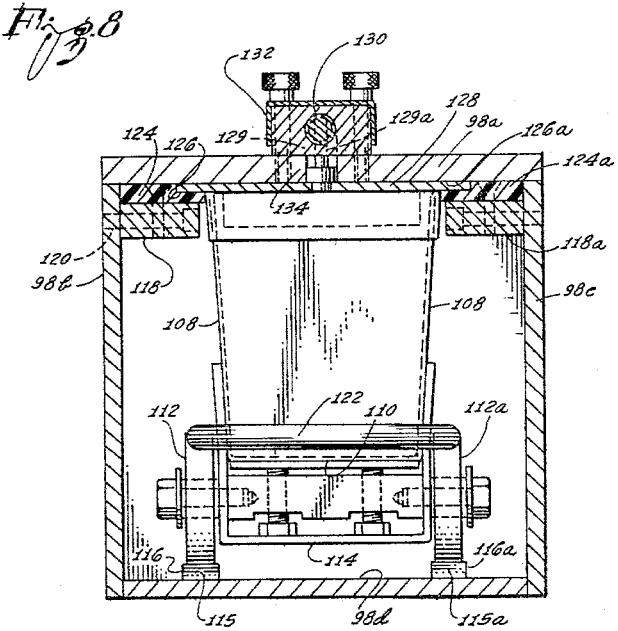
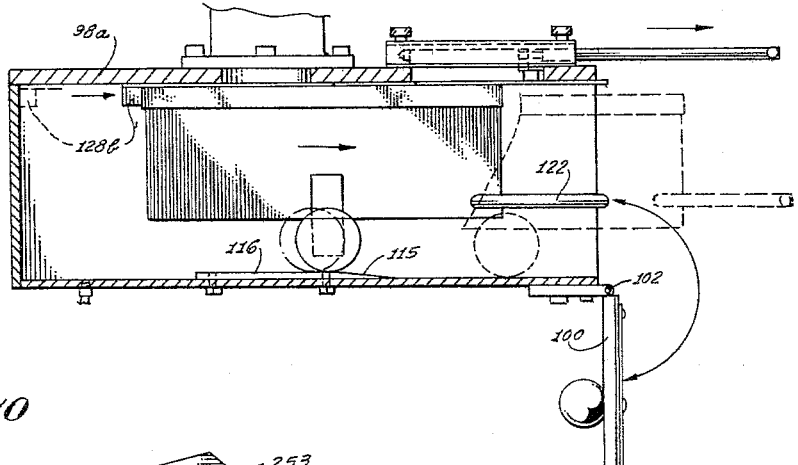
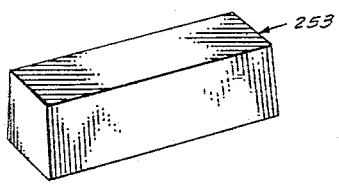
INVENTOR:
Forrest L. Langford
Attorneys March 29, 1966    F. L. LANGFORD    3,242,571
MACHINES FOR MOLDING PLASTIC PRODUCTS
Original Filed July 11, 1962    5 Sheets-Sheet 5
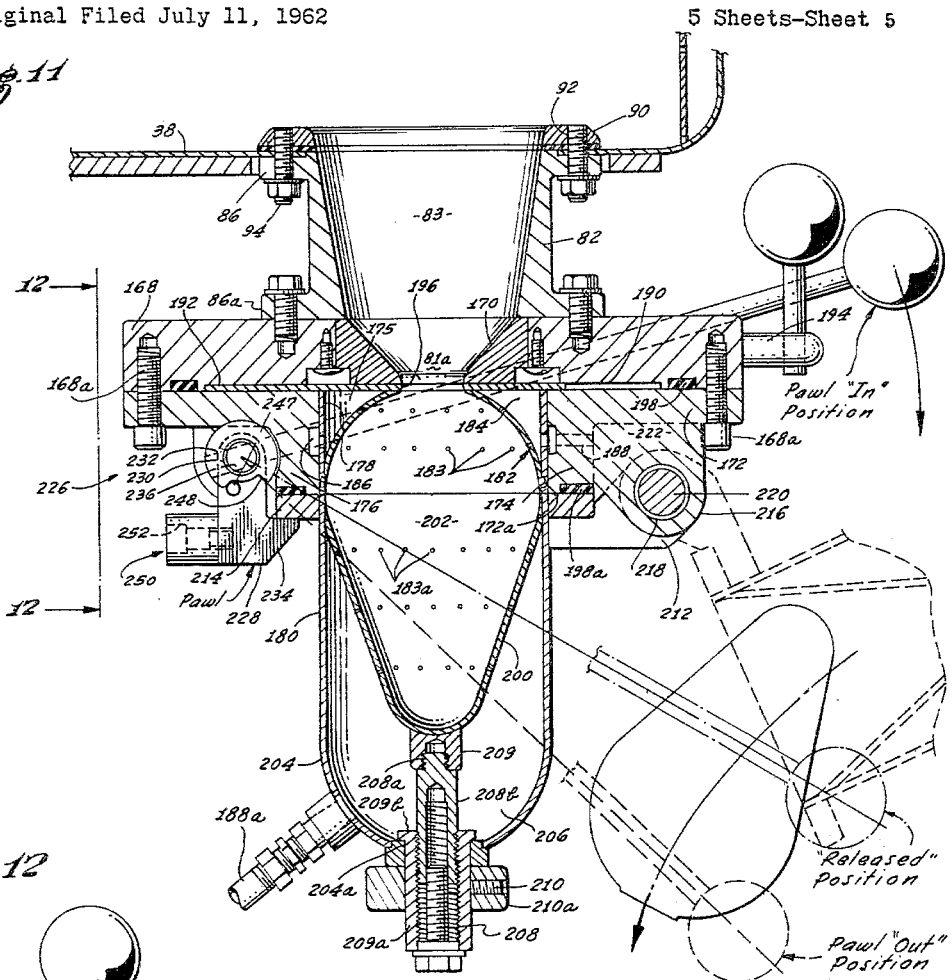
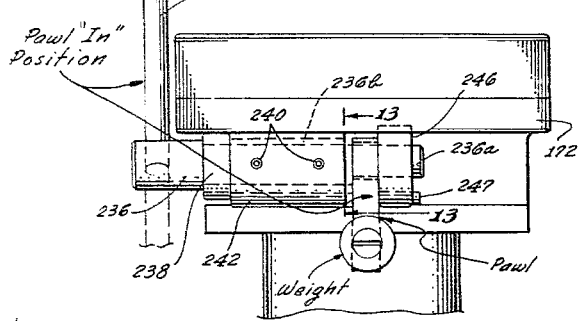
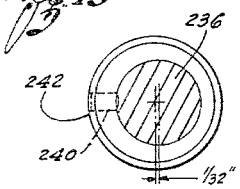
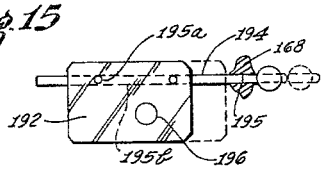
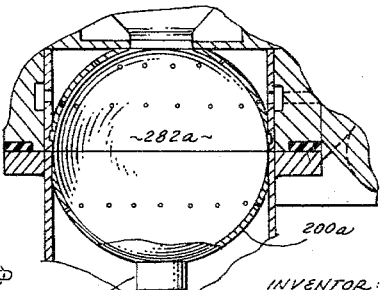
INVENTOR:
Forrest L. Langford
Attorneys United States Patent Office 3,242,571
Patented Mar. 29, 1966

3,242,571
MACHINES FOR MOLDING PLASTIC
PRODUCTS
Forrest L. Langford, Canoga Park, Calif., assignor, by mesne assignments, to Western Foods Machinery Company, Santa Monica, Calif., a corporation of California
Continuation of application Ser. No. 209,193, July 11, 1962. This application July 30, 1964, Ser. No. 387,547
7 Claims. (Cl. 31—44)

This is a continuing application of application Serial No. 209,193, filed July 11, 1962, now abandoned. This invention relates generally to improvements in machines for molding plastic or fluid products by the use of a vacuum or air pressure differential, and, in particular, to machines adapted for molding cheeses into bricks, balls or other solid configurations. The embodiments of this invention shown in the accompanying drawings, and specifically described herein, is especially adapted for the molding of mozzarella type cheeses into various configurations.

In the molding of mozzarella type cheese, before the curd is passed into the mold cavity, it must be brought to, and maintained at, a certain plastic consistency by heating it to a temperature in the vicinity of 120 degrees Fahrenheit. This may be accomplished by placing the cheese curd in a vat filled with water heated to such temperature. However, while in such a vat, the plastic cheese curd entrains a certain amount of water, in addition to the natural water content of the curd, which, desirably, should be removed from the curd immediately prior to, or at the time the curd is caused to flow into the mold cavity. A molding machine for this type of cheese, should therefore include means for removing as much water as possible in the course of the molding process. Preferably such means will drain off a certain amount of water while the curd is standing in the hopper awaiting molding, and the balance of the water will be effectively squeezed out as the cheese is being drawn from the hopper into the actual molding unit.

Also, once mozzarella cheese curd is removed from the hot water vat and deposited in apparatus for molding it into bricks, balls, etc., the curd should be molded quickly and completely, unless the apparatus includes heating means for maintaining the curd at a high enough temperature to insure proper plasticity while it awaits admission to mold cavities.

Further desiderata of a machine for molding mozzarella cheese are: simplicity of operation; the ability to mold the curd into different shapes of cheeses; and that the molding be accomplished as quickly as possible after the curd is withdrawn from the vat, and done so completely in one step, in order that the cheese "skin" formed in the initial molding process be not thereafter broken nor sought to be reformed without resubjecting it to hot water treatment to replasticize it. Once the cheese has taken a molded shape, it has been found to be difficult thereafter to reform it to another configuration, since the molded cheese will be found to possess a "memory" of its original molded configuration, and upon any attempted reforming (without replasticizing it through hot water treatment), tends to reassume its original configuration.

Certain cheese manufacturers employ curds of different consistency and content for molding cheeses into ball shapes, from what they use when molding cheese into bricks or other configurations. If, therefore, the same machine is to mold both shapes simultaneously, provision must be made for separating the two types of curds.

In recent years a number of cheese molding machines have been devised, some of which employ one or more vacuum stages for molding mozzarella cheese. However, these machines have been complicated in construction, with the result that they are difficult to maintain in continuous operation, require costly servicing, and result in loss of valuable production time to their owners.

Certain of these machines have also been difficult to clean, and since, for the handling of a relatively unstable product like cheese curd, a molding machine must be regularly cleaned to avoid the accumulation of bacteriologically deteriorating curd particles, any such difficulty also results in expensive "down time" of the molding machines.

The complexity of prior machines may also require more skillful labor to operate them, thereby further increasing the cost of manufacturing such cheeses.

The present invention obviates the difficulties encountered with prior machines and fully accomplishes the above-mentioned desired objectives in a cheese molding machine, in that the molding is rapidly accomplished in a simple series of steps, while water or moisture is simultaneously drained and squeezed from the curd as it is readied for, and during the molding step; and the machine may be easily and rapidly cleaned. Also, it is relatively simple in construction and operation, so that it may readily be operated by unskilled labor, and kept in continuous operation with a minimum of "down time" for cleaning and/or servicing. Moreover, the present invention may be practiced with an apparatus by which a series of molding elements may be simultaneously or sequentially operated to mold cheeses at a rapid rate. Further, provision is made for molding two different types of cheese curd at the same time.

The present invention may be better understood from a consideration of the following detailed description of the preferred embodiments thereof with reference to the accompanying drawings, in which:

FIGURE 2 is a perspective view, reduced in size, of the upper portion of the apparatus from the rear;

FIGURE 3 is a side elevation of an air switching device of the type incorporated in the FIGURE 1 apparatus;

FIGURE 4 is a view of the switching device of FIGURE 3 looking in the direction of the arrows along the line 4—4 of FIGURE 3;

FIGURE 5 is a view partly in section taken on the line 5—5 of FIGURE 4;

FIGURE 6 is a partial view similar to that of FIGURE 3, showing the control tube in vacuum relieving position;

FIGURE 7 is an enlarged sectional drawing taken on the lines 7—7 of FIGURE 1;

FIGURE 8 is a section taken on the lines 8—8 of FIGURE 7;

FIGURE 9 is a reduced partial representation of the rectangular molding element shown in FIGURE 7, showing its access door opened, and illustrating the manner in which the actual molding box is removed;

FIGURE 10 is a perspective view of the cheese "brick" which has been molded and removed from the molding element shown in FIGURE 9;

FIGURE 11 is a section taken on the lines 11—11 of FIGURE 1;

FIGURE 12 is a partial side view of the molding element shown in FIGURE 11, as seen in the direction of the arrows from the line 12—12 of FIGURE 11;

FIGURE 13 is a section on the line 13—13 of FIGURE 12;

FIGURE 14 is a view of a part of the FIGURE 11 element in which a different lower half of the mold has been substituted for that shown in FIGURE 11;

FIGURE 15 is a plan view of the cutter plate shown in the FIGURE 11 unit.

Figure 1:
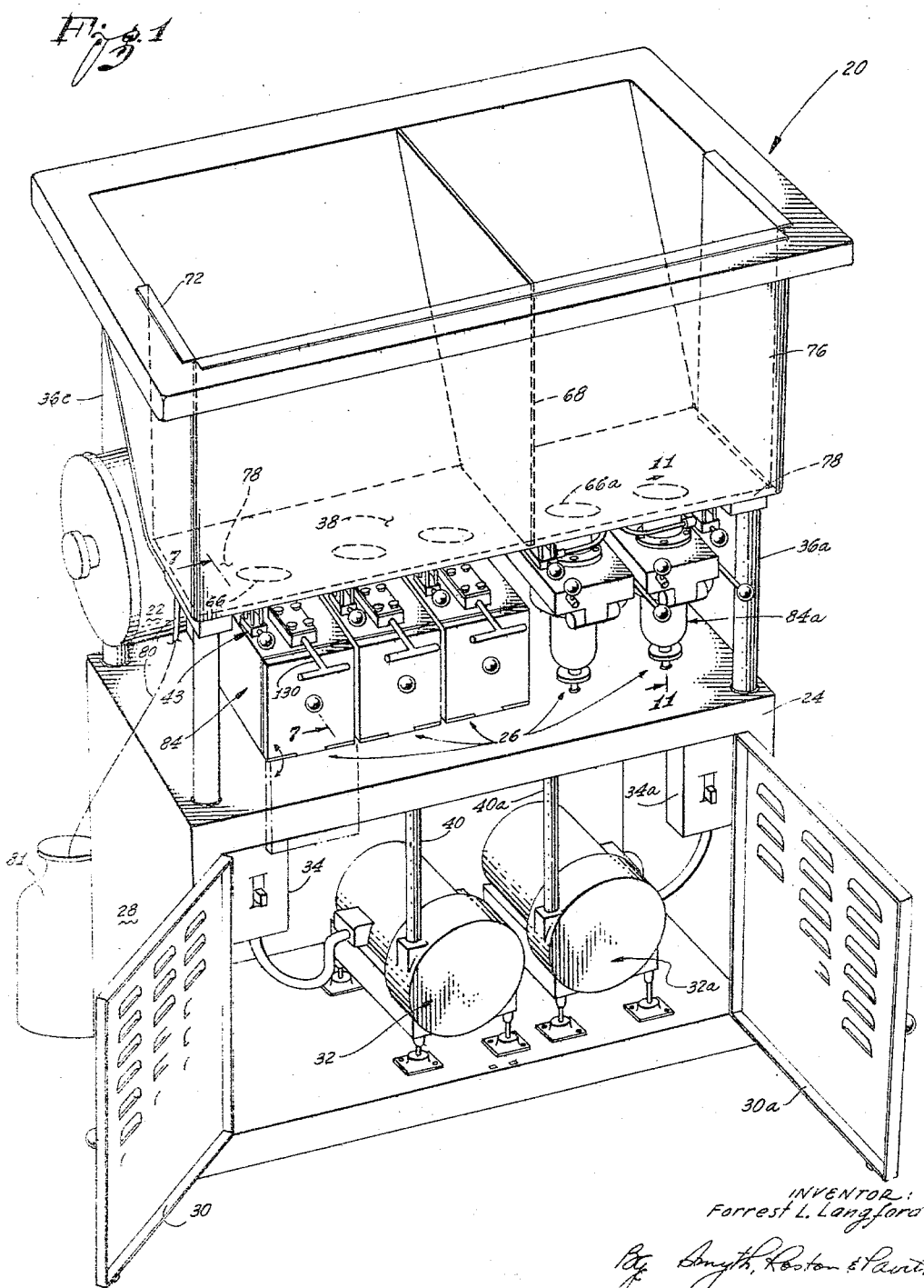
FIGURE 1 is a perspective view of a preferred embodiment of an apparatus constructed according to the present invention.

Referring initially to FIGURE 1, the illustrated apparatus, which represents the preferred embodiment of the present invention, comprises basically four main units, namely: a hopper 20, a vacuum accumulator 22, a pump and pump housing unit 24, and a battery of molding elements 26.

The pump and pump housing unit 24 includes a rectangular box-like housing 28, having hinged access doors 30, 30a, which housing serves to enclose a pair of pumps 32, 32a, electrically operated by separate switches 34, 34a respectively. The housing 28 further serves as a mounting for the other three basic units 20, 22 and 26. Mounting of the hopper is effected by means of four vertical posts 36, 36a, 36b and 36c. The battery of molding elements 26 is pendently secured to the underside of the lower wall 38 of the hopper unit 20.

While only a single pump 32, is actually necessary to evacuate the air from the vacuum accumulator 22, and from the molding elements, it has been found desirable to provide a standby pump 32a, which is also connected to the vacuum accumulator, in case of failure of pump 32. The presence of such a standby pump enables the apparatus to be kept in continuous operation without costly interruption of production, whenever one pump fails or must otherwise be removed for servicing.

Each of the pumps 32, 32a is connected to the vacuum accumulator 22 by pipes 40 and 40a respectively, through a manifold and valve arrangement (not shown) which alternatively serves to connect one or the other of the pipes 40, 40a to the line 41 to the vacuum accumulator 22. The vacuum accumulator, in turn, is provided with a series of conduits 42 (FIGURE 2), each of which is connected to an air switching device 43 of one of the several molding elements.

The vacuum accumulator 22, is constructed of a hollow cylinder 44, the inside walls (not shown) of which are highly polished in order that they may be kept spotlessly clean. The ends of this cylinder 44 are closed by a pair of circular plates 46, 46a, and are secured against the cylinder rims with appropriate sealing rings 48 by means of a rod 50, and a knurled capping nut 52. One end of the rod 50 is welded to circular plate 46 and the other extremity of the rod is threaded at 56. The circular plate 46a is centrally orificed at 58 to permit the threaded end of the rod 50 to be passed through the plate 46a. This threaded end of the rod 50 is also inserted through the three-armed equiangular spacer unit or spider 60, and the latter may be secured normally to the rod by nuts 57, 57a. A portion of this threaded rod end protrudes through the hub 62 of the spacer unit 60, and through the orifice 58 in the plate 46a. By then threading the knurled capping nut 52 onto this protruding rod end 56, both plates 46 and 46a may be drawn tightly against the rims of the cylinder 44. An appropriate sealing element (not shown) may be provided in and about the orifice 58 in the plate 46a, to provide a completely airtight cylinder when the plates 46, 46a are so drawn against the cylinder rims.

The cylinder 44 is mounted upon the top wall 29 of the housing 28 by means of plurality of vertical posts 63, thereby securing the vacuum accumulator 22 against any movement relative to the housing 28 or the hopper 20. A fitting 64 is provided in the wall of the cylinder 44 to enable the cylinder to be readily drained of moisture.

The hopper unit 20 may be of any configuration which is adapted to conduct plastically flowing material (which, in the case of this particular apparatus, is mozzarella cheese curd), to its lowermost area, for delivery through any of a series of outlets 66 or 66a. The hopper shown in FIGURES 1 and 2, may be divided into two compartments by a vertical wall 68, where it is desired to mold different curds or to mold in less than the full battery of molding units. The forward vertical wall 70 is constructed of an inner sheet 72, having a series of small perforations 74, and an outer solid, preferably metal, sheet 76 spaced from the inner sheet by a short distance—sufficient to permit water, seeping through the perforations 74 from, and entrained in, the plastic cheese curd, to pass downward between the sheets to a trough 78 from which it is continuously drained through a tube 80 to a can or other receptacle 81.

Each of the hopper outlets 66 is preferably circular and receives a downwardly extending fitting 82 (FIGURE 7) which provides a frusto-conical passage or "fill neck" 83 from the bottom 38 of the hopper 20, to the inlet 81, 81a of a molding element 84, or 84a. This fitting may be substantially cylindrical in its outer configuration with flanges 86, 86a drilled or otherwise orificed to receive bolts 88, 88a. An annular member 90, with holes 92 in registry with the holes 94 in the upper flange 86 of the fitting 82, provides means whereby the latter may be fixedly secured to the bottom wall 38 of the hopper 20 by bolts 88, and also provides a raised rim to prevent water collecting on the bottom wall 38 from flowing into the passage 83 instead of draining out through the trough 78. The bottom wall 38 of the hopper may be reinforced by a thicker, more rigid wall 39, which is provided with orifices 96. Each of the latter is preferably larger in inside diameter than the orifices 66, 66a in the bottom wall 38, so as to be capable of receiving the flange 86 of the fitting 82.

As may be observed from FIGURE 1, the apparatus there shown includes two quite different types of molding elements, 84 and 84a. Considering first the 84 type element, illustrated in FIGURES 7–9 inclusive, a rectangular boxlike housing 98 is bolted to the underside of the flanges 86a of the fitting 82. This housing 98 is provided with an inlet opening 81, which registers with the outlet of the fitting 82, when the housing 98 is bolted in place to the latter. An access door 100 is hinged at 102 to open outwardly and downwardly, as shown in FIGURES 7 and 9. The inner edges of this door 100 are lined with a material 104, such as rubber, to provide an airtight seal for the housing when the access door is raised and closed. Preferably the door is so balanced in reference to its hinge 102, that it tends to remain in a closed position after it is swung upwardly and its edge 100a, pressed against the forward upper edge of the top wall 98a of the housing 98. Suitable handle means 100b should be provided to open or close the door 100.

The actual molding of the cheese brick is accomplished in an open top inner container 106. This container may be constructed with the side walls 108 flaring slightly outwardly upwardly from the bottom wall 110, in order that the molded cheese brick may be readily removed from this molding container 106. The latter is emplaced to receive cheese curd for molding by means of a pair of wheels 112, 112a, mounted to the underside of the container 106 by bracket 114, which wheels ride up onto a ramp 115, 115a of the tracks 116, 116a, respectively, fixedly laid upon the floor 98d of the housing 98. To insure that, when the container 106 is inserted in the housing 98, the wheels 112, 112a will so ride up onto the tracks 116, 116a, guide elements 118, 118a are mounted by bolts 120 on to the upper side walls 98b, 98c of the housing. A handle 122 is also provided for the front wall 106a of the container 106. Further resilient guide means 124, 124a, having a low coefficient of friction (e.g. Teflon), are interposed between the guide elements 118, 118a respectively, and the upper housing wall 98a. These guide means 124, 124a are recessed at 126, 126a respectively, to receive slidably the edges of a cutter blade 128, which is disposed in close abutment with the underside of the top housing wall 98a, to serve as gate means at the mold inlet. The forward end 128a of this blade 128, is connected by a sleeve 129 and pin 129a to a rod 130, slidably housed in a rectangular mounting block 132. The latter may be secured by bolts 133 to the wall 98a. The housing wall 98a is slotted at 134 to allow the sleeve 129 to travel a distance at least as great as the diameter of the mold inlet opening 81. T-type handle means 136 may desirably be provided at the forward end of the rod 130. A block member 128b is welded or otherwise secured transversely to the underside of the rear edge of the cutter blade 128.

Desirably, the side walls of container 106 may be provided with some perforations 107 to relieve strain in its walls resulting from pressure changes, although such perforations may not be necessary if the container walls are very strongly constructed. Such perforations may also improve the curd flow into the container 106.

To control evacuation of air from the inside of the housing 98, and its re-pressurization, in accordance with the present invention, there is provided an air switch 43, which is shown in detail in FIGURES 3–6. This switch may be constructed of a block 138, having a bore 140, which slidably receives a cylindrical tube 142. This tube may be closed at its forward end 142a by a spherical handle 144, threaded onto a sleeve or plug 146 inserted fixedly in the tube end, as best shown in FIGURE 3. Annular stop means 148 are provied to limit travel of the tube axially in the bore 140. The opposite end of the tube 142 is provided with a fitting 150 for coupling this end to another fitting 152 on the end of a flexible air hose 154. The latter passes down around the back of the housing 98 and is connected by another fitting 156 in the floor 98d of the housing 98 to place the space defined by the latter in open communication with the inside of the tube 142. The block 138 is further orificed laterally at 141 to receive an elbow 158 which is coupled by a fitting 160 to an air conduit 42 communicating with the vacuum accumulator 22 by connection 162. An atmospheric vent hole 164 is provided in, and adjacent the end of, the tube 142 which is coupled to the hose 154. Rigid elements 166 may be provided to dispose the block 138, a suitable distance below the hopper wall 39. An annular recess 141a in the block 138, serves to insure that, when the tube is drawn forward by the handle 144, the vent hole 164 will be placed in communication with the lateral bore 141.

The mold elements 84a may have identical fittings 82, described above in connection with the mold element 84. However, the actual molding mechanism is quite different, as may be seen in FIGURES 11–15. In lieu of the box-like housing 98, there is bolted to the flanges 86a of the fitting 82, a plate 168, which is recessed to receive a funneling insert 170, the outlet of which is constricted to a relatively small diameter passage 81a. An annular stationary mold housing casting 172 is bolted to the underside of the plate 168. This casting 172 is formed with a hollow downwardly extending annular crown 174, the inner walls 176 of which define a cylindrical orifice 175. Within this orifice 175 is inserted as a liner, the upper portion 178 of an outer shell-like housing 180.

An inner molding shell portion 182, which desirably may be substantially hemispherical or dome-shaped in order to provide a space 184 between it and the liner 180 is provided within such liner, and is itself orificed at the top to register with the passage 81a. The walls of the inner molding shell portion 182 are preferably finely perforated at 183 to permit the passage of air therethrough, but not solid material such as cheese curd. The walls 176 are recessed annularly at 186 and connected by a bore 188 via a fitting (not shown) and flexible hose (also not shown) to the fitting 150 of an air switch 43, identical to that illustrated and described in connection with the box-like type housing molding unit 84. The plate 168 is recessed at 190 to receive slidably a cutter blade 192 which is connected to, and operated by, a rod 194, reciprocally movable in a bore 195 within the plate 168, as shown in FIGURE 15. The manner of connecting the rod 194 to the blade 192 may be similar to that employed in connecting the blade 128 to the rod 130 in the embodiment illustrated in FIGURES 7–9. Thus a bolted sleeve 195a to reciprocate a slotting 195b may be provided as shown schematically in FIGURE 15. The cutter plate 192 is orificed at 196, so that, in open position of the rod 194, the cutter plate 192 registers with the inlet passage 81a to permit cheese curd to flow into the mold cavity. Annular sealing means 198 are provided to encircle the plate recess 190, and similar means 198a are disposed in the plane of the mold separation to seal the mold juncture area when the mold is closed.

The lower inner mold shell portion 200, which is required to complete definition of the mold cavity 202 may be generally conical, as shown in FIGURE 11, or hemispherical, as is 200a in FIGURE 14. The upper rim of the shell portion 200 (or 200a) is of such size and configuration as to mate with the lower rim of the portion 182 or housing portion 178. This lower shell portion 200 is secured within the lower section 204 of the shell-like housing 180, and is separated from the inner walls of the latter to provide an air space 206. The latter also communicates through a connection and hose, designated generally by the numeral 188a, with the fitting 150 of an air switch 43 in a manner (not shown). The walls of the lower shell portion 200 may also be perforated.

To properly orient the lower shell portion 200, one end of a cylindrical cap 209 is welded to the outside of the portion 200 in a coaxial disposition therewith. This cap is bored concentrically at its opposite end and threaded to receive the matingly threaded extremity 208a of a fitting 208b. The latter, in turn, may be hollowed and provided with internal threading to receive a bolt or stud 208. The fitting 209b is held in an orifice 204a in the outer shell 204 by means of a sleeve 209a, flanged at one end 209b and internally threaded. A collar 210a is passed over the sleeve 209a and held fixedly thereon by a set screw 210.

By this arrangement, the capacity of the mold cavity 202 may be varied within certain limits, since the greatest outside diameter of the shell portion 200 is dimensioned to coincide with the inside diameter of the lower section 204 of the housing 180, thereby enabling the shell portion 200 to be forcibly slid axially within the housing 180. The exact disposition of the shell portion 200 within the housing 180 may be determined by the setting of the adjustable threaded fitting 208b, in a manner later explained.

The lower shell-like housing 204 is secured within a casting 212, which includes an annular portion 214 circumscribing the rim of the housing 204, and a pair of ears 216, 216a disposed parallel to, and spaced from, each other. Both of these ears are circularly orificed at 218, 218a about a common transverse axis, to receive a pin 220. This casting and lower mold assembly is pivotally secured to one side of the stationary mold housing portion 172 by means of a lug or ear 222, preferably integrally cast as a part of the body of the mold housing portion 172, and which lug or ear 222 is dimensioned to fit within the spacing between the ears 216, 216a. An orifice 224 of the same diameter as the orifices 218, 218a is provided in the lug or ear 222. When the casting 212 is placed up against the lower rim 172a of the housing portion 172, and the orifices 218, 218a are co-aligned with orifice 224 of the lug 222, the pin 220 may be passed through all three orifices, thereby pivotally securing the casting 212 to the housing portion 172.

In order that the casting 212 may be held firmly against the lower rim 172a of the housing portion 172, a locking mechanism, designated generally as 226 may be employed.

This mechanism, shown in FIGURES 11, 12 and 13, preferably comprises an L-shaped member 228, orificed at 230 at one end 232 and formed with a leg 234 to constitute a hook. To hook and unhook this L-shaped member 228, an axle 236 having an eccentric end 236a is provided. This eccentric end 236a is inserted into the orifice 230, and the symmetrically cylindrical portion 236b of the axle 236 is passed through an eccentric bearing 238, secured by set screws 240 mostly within the bore of a lug 242, also integrally cast as a part of the stationary mold housing 172. A radial arm 244 is secured to the opposite end of the axle 236 to enable the latter to be rotated by the application of force upon the arm in the manner of a lever. A flat, collar-like member 246 having an angular recess 248 extending partially circumferentially, is further secured on the end of the axle 236. A pin-like projection 247 is provided to extend parallel to the axle from the member 228 into the recess 248, and a small, heavy weight 250 may be secured by a bolt or screw 252 to the back side member 228. The recessed collar-like member 246 and projection 247 serve to lock in the pawl or hook member 234 when the handle 244 is pivoted to the position shown in FIGURE 12, and to kick it out, when the handle is pulled down.

To operate the apparatus, the elements of which have been described in some detail above, each of the cutter blades which serves to close a mold inlet 81 or 81a, is placed in closed position, and the air switches 43 are moved into positions which block off passage of any air to the vacuum accumulator 22 and vent the housings surrounding the actual mold shell units to the atmosphere. One of the switches, 34 or 34a, is then thrown to start up a pump 32 or 32a thereby evacuating substantially all of the air from the vacuum accumulator 22.

Cheese curd in moist, hot plastic state, may be poured into the two chambers of the hopper 20—preferably before the insertion of the containers 106, to allow surface water to be forced away from the "fill neck" passage 83, thereby avoiding the collection of water in the container 106.

In the case of each of the box-like molding elements 84, the door 100 is opened and an open top inner container 106 is inserted as far as possible into the rectangular box-like housing 98. Upon such insertion, the wheels 112, 112a will ride up upon the ramps 115, 115a and then on to the tracks 116, 116a. In this posture, the upper rim of the inner container 106 will be positioned against the underside of the cutter blade 128, and as this container 106 is pushed further rearwardly the upper edge of its back wall 106b will press the cross-block 128b to the left, thereby moving the cutter blade 128 into the open passage position shown in FIGURE 7.

The handle 144 of the air switch 43 for this readied box-like molding element 84, is then pulled forwardly from the front of the machine, thereby moving the tube 142 into the position shown in FIGURE 3. In this position, the atmospheric vent hole 164, and hence, the tube 142 and hose 154, are placed in communication with the lateral bore 141, through the annular recess 141a. Since the bore 141 is connected by means of the elbow 158, fitting 160 and the conduit 42, to the vacuum accumulator 22, the air inside of the housing 98 is immediately exhausted to the vacuum accumulator through the flexible air hose 154 and condit 42. As the air pressure inside the housing 98 is thereby greatly reduced, atmospheric pressure, acting upon the top surface of the curd in the hopper 20, presses upon the curd to force it through the hopper outlet 66, the passage 83, and the mold inlet 81. The flow of cheese curd will continue until the container 106 is completely filled with curd. It has been found that such filling is accomplished within somewhere between 10 and 15 seconds. The gradual inward taper of the walls defining the fill neck 83, during the filling process, actually effects a pulling and squeezing of the curd, such that the water remaining in the curd is forced back out over the rims 90 and passed into the trough 78 for drainage through the tube 80.

At this point, the air switch handle 144 is shoved inwardly to effect a switching of the tube 142 from communication with the vacuum accumulator 22, to a position in which the vent hole 164 is opened to the atmosphere (as shown in FIGURE 6), thereby restoring atmospheric pressure to the inside of the housing 98. At about the same time, the rod 130 is pulled forward. This effects a movement of the cutter blade 128, in a righthand direction, thereby closing off the passage 81, as seen in FIGURE 7. Simultaneously, the transverse block 128b, secured to the cutter blade 128, presses against the upper portion of the lefthand wall 106b of the container 106, and moves the container to the right until the handle 122 strikes the inside of the access door 100, knocking the same open. The operator of the apparatus then simply grasps the handle 122 and pulls out the container 106, turns it over and dumps out the molded brick 253, which has taken the shape shown in FIGURE 10.

This process may be repeated in rapid sequence by the operator with each of the elements 84, preferably utilizing the waiting time of 10 to 15 seconds for molding in one element, to get up and operate the next molding element or unit.

Operation of the elements 84a is similar in certain respects to that of the box-like molding elements 84 which have been provided to mold pear shaped or rounded cheeses. The air switches 43 operate in an identical manner to those involved in the molding through the box-like elements 84. Each of these switches is initially pushed inwardly to an atmospheric venting position wherein the space 206 within the housing 98 is cut off from communication with the vacuum accumulator 22. The pivotable portion 180 of the molding element 84a, is pushed up to the position shown in FIGURE 11, wherein the annular member 214 of the casting 212 abuts the lower rim 172a of the stationary mold housing portion 172; and is secured in this position by the L-shaped member 228 by pivoting the rod 244 upwardly about the axis of the eccentrically ended axle 236. This eccentricity of the axle rod, when the axle is thus rotated, effects a pressurized closing of the hook member 228 over the annular rim 214.

When the two mold halves are thus secured together, the rod 194 is moved to shift the cutter blade 192 into open position and the handle of the air switch 144 may be pushed inwardly, thereby placing the upper housing space 175, and the lower housing space 206, in communication with the vacuum accumulator 22 through the passage 188 and the conduit 188a respectively. As in the case of the box-like molding element, such communication with the vacuum accumulator 22 results in an immediate exhaustion of all air in the spaces 175 and 206, and through the perforations 183 and 183a; also from the cavity 202 defined by the mold walls 182 and 200. Also, as in the case of the box-like molding element 84, this exhaustion of air and reduction of air pressure results in cheese curd being forced through the passage 83 and mold inlet 81a, until the pear-shaped cavity 202 is completely filled, whereupon the air switch handle 43 is pulled out to vent the spaces 175 and 206 to the atmosphere; the cutter blade 192 is moved to a closed position; and the rod 244 is pulled down to unlatch the L-shaped member 228. With such unlatching, the movable casting 212 pivots downwardly and sidewardly in the manner shown in dotted lines in FIGURE 11, and the pear-shaped molded cheese may readily be dumped or removed from the mold.

It will be seen that the lower molding shell 200 is secured within the housing portion 204 by the cap 209 and combination of the fitting 208b, threaded into the cap 209, the sleeve 209a, collar 210a and bolt 208. If it is desired to increase the volume of the mold cavity 202, and hence the weight of the molded cheese, it is only necessary to unscrew the bolt 208, and then rotate the collar 210a to draw the fitting 208b axially outwardly of the mold cavity 202, through the action of the threaded sleeve 209a which rotates with the collar 210a. Since the threaded end of the fitting 208b is engaged with cap 209, such withdrawal of the cap 209 forces the shell 200 to slide axially within the housing 204, thereby increasing the volume of the cavity 202.

If it is desired to mold the cheese in a ball, instead of a pear shape, it is simply necessary to withdraw the threaded end of the fitting 298b from the cap 209 and then remove the lower inner mold shell portion 200 from the lower section 204 of the housing 180. There may then be substituted therefor a hemispheric shell portion 200a with its own cap 209a into which the threaded end of the fitting 208b is then screwed and appropriate adjustment of the fitting 208b, sleeve 209a, collar 210a and bolt 208 is then made to locate the shell 200a as shown in FIGURE 14.

It would, of course, be possible to change more radically the capacity of this molding unit by replacing the upper and lower mold housings and their associated parts, and this may be readily accomplished by removing the bolts 168a.

It will thus be seen that the present invention provides a very effective method and apparatus for molding mozzarella type cheese of different sizes and shapes at a rapid rate. It would, of course, be possible to provide all identical molding elements of either type herein shown, instead of some of the box-like type 84 and others of the pear or round type 84a. However, an apparatus of the type shown in the accompanying drawings, and hereinabove described is quite versatile and desirably offers its owner the advantage of being able to mold different sizes and shapes of cheeses as may be desired.

The vertical wall 68 which divides the hopper 20 enables the operator to select for molding either battery of mold elements and confine molding to that particular battery, or simultaneously to mold two different types of cheese curd. It is possible, however, for this wall to be dispensed with, and if the hopper is substantially filled with the same cheese curd, the operator may sequentially mold both different configurations of cheeses from the same batch of curd.

While this apparatus and method has been described for particular application for the molding of mozzarella cheese, it could be readily adapted to mold other types of plastically flowing cheeses, and the principles could be employed for the molding of other plastic products, particularly those of solid configurations.

All of such adaptations are intended to be comprehended within the scope of the following claims.

What is claimed is:

1. Apparatus for molding a plastic material comprising:
 (A) hopper means for receiving and containing the said material immediately prior to molding, said hopper means having an outlet in its lower area through which the material may be drawn for delivery into molding means;
 (B) molding means, said molding means:
  (1) including at least two complementary separable walls;
  (2) gate means to open and close said hopper outlet, there being means to operate said gate means;
   (a) said walls when brought together, with said gate means when closed, defining a cavity of constant volume to receive the said material and to mold it substantially into the desired finished molded configuration,
   (b) having an inlet in communicating registry with the outlet of the hopper means and governed by said gate means,
   (c) and having air passage means insufficient to discharge substantial amounts of plastic material when within said walls;
 (C) a housing spaced from, and enclosing at least a portion of the inlet area of the molding means and communicating with the interior space of said molding means through said air passage means;
 (D) means to evacuate substantially all of the air from said housing means and said molding means through said air passage means, thereby to create an image of low pressure in the vicinity of said inlet to the molding means while the pressure above the material in said hopper is maintained at a higher level, whereby said material, when said gate means is opened, is forced by such greater pressure, acting upon said material in said hopper means, through said outlet and the molding means inlet, and is deposited within said cavity;
 (E) means to restore air pressure in said housing to a level substantially equal to that prevailing in said hopper means; and
 (F) means to separate the said walls after the molding means cavity is filled with said material, to permit removal of the molded material.

2. Apparatus for molding mozzarella cheese, comprising:
 (A) hopper means for receiving and containing the cheese curd immediately prior to molding, said hopper means having an outlet in its lower area through which the curd may be drawn for delivery into molding means;
 (B) molding means, said molding means:
  (1) including at least two complementary separable walls;
  (2) gate means to open and close said outlet there being means to operate said gate means;
   (a) said walls when brought together with said gate means when closed defining a cavity of constant volume to receive the said cheese curd and to mold it substantially into the desired finished molded configuration,
   (b) having an inlet in communicating registry with the outlet of the hopper means and governed by said gate means,
   (c) and having air passage means insufficient to discharge substantial amount of cheese curd when within said walls;
 (C) a housing spaced from and enclosing at least a portion of the inlet area of the molding means and communicating with the interior space of said molding means through said air passage means;
 (D) means to evacuate substantially all of the air from said housing means, thereby to create an area of low pressure in the vicinity of said inlet to the molding means while the pressure above the cheese curd in said hopper is maintained at a higher level, whereby said curd, when said gate means is opened, is forced by such greater pressure, acting upon said curd in said hopper means, through said outlet and the molding means inlet, and is deposited within said cavity;
 (E) means to restore air pressure in said housing to a level substantially equal to that prevailing in said hopper means; and
 (F) means to separate the said walls after the molding means cavity is filled with cheese curd, to permit removal of the molded material.

3. Apparatus for molding mozzarella cheese, comprising:
 (A) hopper means for receiving and containing the cheese curd immediately prior to molding, said hopper means having:
  (1) an outlet in its lower area through which the curd may be drawn for delivery into molding means;
  (2) a perforated wall, said wall dividing the hopper into a space to receive the cheese curd, and a space through which water entrained in the curd may escape downwardly and drain off; and (3) means to drain away from the last mentioned space, water accumulating therein;
(B) molding means, said molding means:
(1) including at least two complementary separable walls;
(2) gate means to open and close said outlet, there being means to operate said gate means;
(a) said walls when brought together with said gate means when closed defining a cavity to receive the said cheese curd and to mold it substantially into the desired finished molded configuration,
(b) having an inlet in communicating registry with the outlet of the hopper means,
(c) and having air passage means insufficient to discharge substantial amounts of cheese curd when within said walls;
(C) a housing spaced from and enclosing at least a portion of the inlet of the molding means and communicating with the interior space of said molding means through said air passage means;
(D) means to evacuate substantially all of the air from said housing means and said molding means, thereby to create an area of low pressure in the vicinity of said inlet to the molding means while the pressure above the cheese curd in said hopper is maintained at a higher level, whereby said curd, when said gate means is opened, is forced by such greater pressure acting upon said curd in said hopper means, through said outlet and the molding means inlet, and is deposited within said cavity;
(E) means to restore air pressure in said housing to a level substantially equal to that prevailing in said hopper means; and
(F) means to separate the said walls after the molding means cavity is filled with said material, to permit removal of the molded material.

4. Apparatus for molding mozzarella cheese, comprising:
(A) hopper means for receiving and containing the cheese curd immediately prior to molding, said hopper means having:
(1) an outlet in its lower area through which the material may be drawn for delivery into molding means;
(2) gate means to open and close said outlet; and
(3) means to operate said gate means;
(B) molding means, said molding means:
(1) including an inner container and an outer container, said outer container:
(a) having an inlet in communication with the outlet of said hopper means, and
(b) means to open and close said outer container to provide access to the same; said inner container when closed including said gate means as one of its defining walls; (i) being of such size and dimensions as to fit within the outer container, (ii) defining a cavity of constant volume to receive cheese curd for molding into a predetermined configuration, (iii) having an opening in its upper area into said cavity governed by said gate means, (iv) being constructed to permit removal of molded cheese curd from said cavity, and (v) having perforations permitting discharge of air;
(2) means in the outer container to dispose the inner container within the outer container, and with its opening in communication with said inlet of the outer container;
(C) means to evacuate substantially all of the air from said outer container whereby air is drawn out of said mold cavity, thereby to create an area of low pressure in the vicinity of said inlet to the outer container while the pressure above the cheese curd in said hopper is maintained at a higher level, whereby said curd, when said gate means is opened, is forced by such greater pressure, acting upon said cheese curd in said hopper means, through said outlet and outer container inlet, and is deposited within said cavity defined by the inner container; and
(D) means to restore air pressure in said outer container to a level substantially equal to that prevailing in said hopper means.

5. Apparatus for molding a plastic material, comprising:
(A) hopper means for receiving and containing the said material immediately prior to molding, said hopper means having an outlet in its lower area through which the material may be drawn for delivery into molding means;
(B) molding means, said molding means:
(1) including at least two complementary separable walls, said walls:
(a) when brought together defining a cavity to receive the said material and to mold it substantially into the desired finished molded configuration,
(b) having an inlet in communicating registry with the outlet of the hopper means,
(c) and having air passage means insufficient to discharge substantial amounts of plastic material within said walls;
(2) gate means interposed between the hopper means and said cavity and completing said molding means, said gate means being adapted, when operated, to allow or cut off the flow of material from said hopper means through said outlet and molding means inlet thereby opening and closing said molding means, said gate means including means to operate said gate means to open or close the same;
(C) a housing spaced from and enclosing at least a portion of the inlet area of the molding means and communicating with the interior space of said molding means through said air passage means;
(D) means to evacuate substantially all of the air from said housing means and from said cavity, thereby to create an area of low pressure in the vicinity of said inlet to the molding means while the pressure above the material in said hopper is maintained at a higher level, whereby said material, when said gate means is opened, is forced by such greater pressure, acting upon said material in said hopper means, through said outlet and the molding means inlet, and is deposited within said cavity;
(E) means to restore air pressure in said housing to a level substantially equal to that prevailing in said hopper means; and
(F) means to separate the said walls after the molding means cavity is filled with said material, to permit removal of the molded material.

6. Apparatus for molding a plastic material, comprising:
(A) a hopper having an outlet;
(B) means defining a mold cavity, said cavity:
(1) conforming substantially to the shape and dimensions of the desired molded product,
(2) being defined by separable walls at least partially perforated, and
(3) said walls being encompassed by outer housing walls spaced from the perforated walls;
(C) means for selectively connecting and disconnecting said cavity to and from said hopper outlet;
(D) means for evacuating substantially all of the air from the space between the perforated walls and said outer housing walls and said cavity, while maintaining above the material in said hopper a substantially greater air pressure for a long enough period of time to permit an amount of said material sufficient substantially to fill said cavity to be forced through said outlet, by said greater air pressure above the material in said hopper;

(E) means for restoring the air pressure to said space; and (F) means for opening the separable mold walls and removing therefrom the material molded therein.

7. Apparatus for molding mozzarella cheese comprising:

(A) a hopper having an outlet;

(B) means defining a mold cavity, said cavity:
   (1) conforming substantially to the shape and dimensions of the desired molded cheese product,
   (2) being defined by separable walls at least partially perforated, and
   (3) said walls being encompassed by outer housing walls spaced from the perforated walls;

(C) means for selectively connecting and disconnecting said cavity to and from said hopper outlet;

(D) means for evacuating substantially all of the air from the space between the perforated walls and said outer housing walls, and from said cavity, while maintaining above the material in said hopper a substantially greater air pressure for a long enough period of time to permit an amount of said cheese curd sufficient substantially to fill said cavity to be forced through said outlet, by said greater air pressure above the material in said hopper;

(E) means for restoring the air pressure to said space; and (F) means for opening the separable mold walls and removing therefrom the cheese product molded therein.

References Cited by the Examiner

UNITED STATES PATENTS

| | | | |
|---|---|---|---|
| 1,915,488 | 6/1933 | Gere | 99—178 |
| 2,632,227 | 3/1953 | Steele et al. | 18—2 X |
| 2,669,762 | 2/1954 | Blackburn et al. | 18—2 X |
| 2,879,593 | 3/1959 | Schwartz | 31—42 |
| 2,982,661 | 5/1961 | Thompson | 99—178 |
| 3,041,153 | 6/1962 | Elder et al. | 31—89 |
| 3,101,540 | 8/1963 | Dzenis | 31—42 |

SAMUEL KOREN, *Primary Examiner.*

HUGH R. CHAMBLEE, *Assistant Examiner.*